United States Patent [19]

Aoki et al.

[11] Patent Number: 4,639,907
[45] Date of Patent: Jan. 27, 1987

[54] MAGNETO-OPTICAL APPARATUS

[75] Inventors: Yoshio Aoki, Tokyo; Yoshihiro Tsukamura, Kanagawa, both of Japan

[73] Assignee: Sony Corporation, Tokyo, Japan

[21] Appl. No.: 647,535

[22] Filed: Sep. 5, 1984

[30] Foreign Application Priority Data

Sep. 5, 1983 [JP] Japan .................................. 58-162955

[51] Int. Cl.⁴ ............................................. G11B 7/125
[52] U.S. Cl. ...................................... 369/45; 365/113; 369/109
[58] Field of Search ..................... 360/59, 114; 369/13, 369/44, 45, 46, 116, 110, 109; 365/113

[56] References Cited

U.S. PATENT DOCUMENTS

| 4,495,530 | 1/1985 | Yanagida | 369/13 |
| 4,525,824 | 6/1985 | Hatano et al. | 369/45 |
| 4,539,662 | 9/1985 | Hatano et al. | 369/13 |

Primary Examiner—Donald McElheny, Jr.
Attorney, Agent, or Firm—Hill, Van Santen, Steadman & Simpson

[57] ABSTRACT

A magneto-optical apparatus records, reads and erases information by radiating a laser beam on a magneto-optical medium which uses an amorphous material for a recording layer and which is subjected to information writing and erasure, wherein a predetermined DC signal is added to a focus error signal in the erasure mode, and the laser beam irradiates the magneto-optical medium in a defocused state.

2 Claims, 9 Drawing Figures

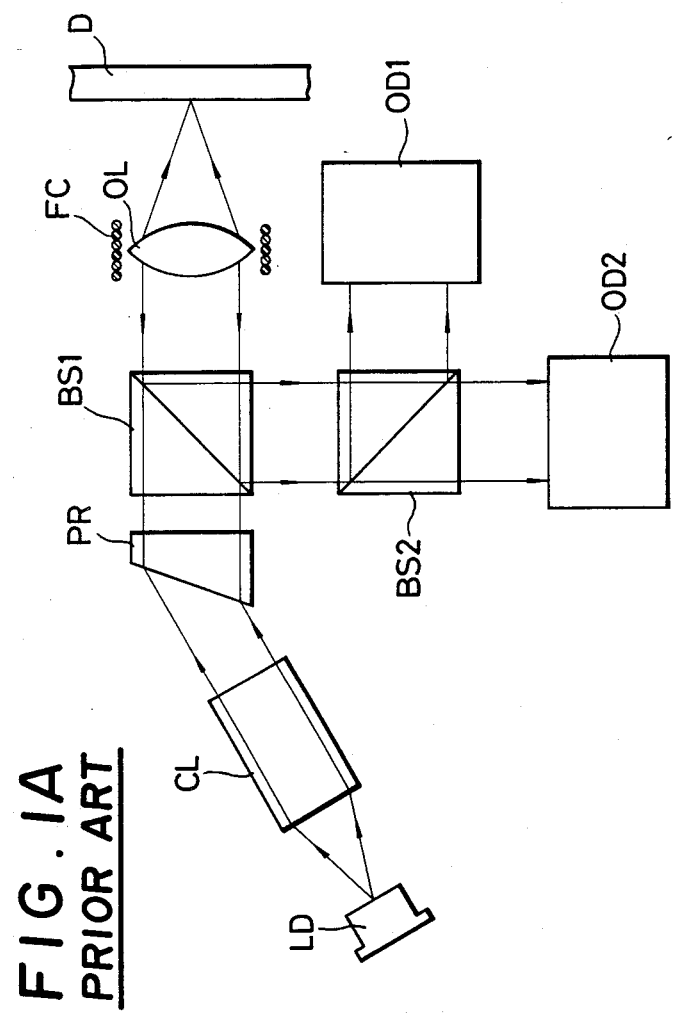
FIG. IA
PRIOR ART

FIG. 2
PRIOR ART
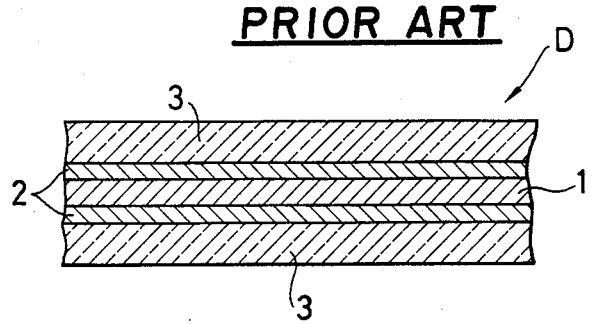
PRIOR ART
FIG. 3A
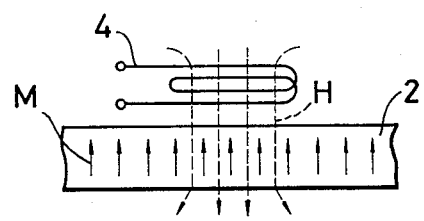
FIG. 3B
FIG. 3C
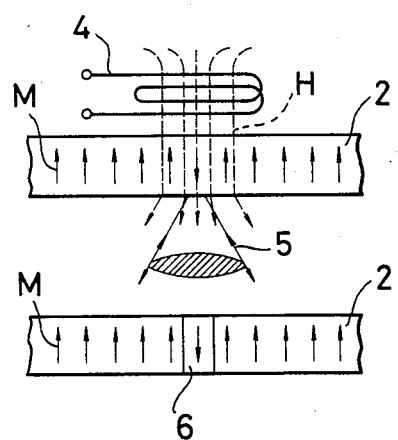

MAGNETO-OPTICAL APPARATUS

BACKGROUND OF THE INVENTION

I. Field of the Invention

The present invention relates to a magneto-optical apparatus for writing, reading and erasing information by irradiation with a laser beam on a magneto-optical medium which uses an amorphous material for a recording layer and which is subjected to the writing and erasure of information.

II. Description of the Prior Art

On a magneto-optical medium after writing and reading of information with irradiation of a laser beam, in order to eliminate recording pits in a write pattern by changing the direction of magnetization of the recording layer with irradiation by the laser beam during erasure, the effective beam spot diameter of the laser beam must be larger than that used during the write mode. This is because the pit size becomes larger than the effective beam spot diameter used in the write mode, and the pits cannot be effectively completely erased unless the beam spot during the erasure mode has a larger diameter than that used during the write mode.

However, when the laser beam spot diameter is increased by increasing the laser output, the amorphous material of the recording layer is crystallized which prevents re-recording and reuse of the recording layer.

Furthermore, in a magneto-optical medium which has recording layers formed on the upper and lower surfaces of protective films which are used for two-side recording, when the laser output level is excessively increased so as to erase recording pits on one side during the erasure mode, the recording layer on the other side is adversely affected in prior art devices.

SUMMARY OF THE INVENTION

It is a first object of the present invention to provide a magneto-optical apparatus in which the beam spot diameter for irradiating a magneto-optical medium can be increased without increasing the laser output and without causing crystallization of the amorphous material of the recording layer.

It is a second object of the present invention to provide a magneto-optical apparatus wherein when one side of a two-sided magneto-optical medium is erased, the recording layer on the other side will not be adversely affected.

BRIEF DESCRIPTION OF THE DRAWINGS

FIG. 1A is a schematic view of an optical system of the prior art;

FIG. 2 is a sectional view of the prior art magneto-optical disk used in the system of FIG. 1A FIGS. 3A, 3B and 3C are respectively schematic sectional views for explaining the principle for writing information in a recording layer according to the prior art;

DETAILED DESCRIPTION OF THE PREFERRED EMBODIMENT

Figure 1B:
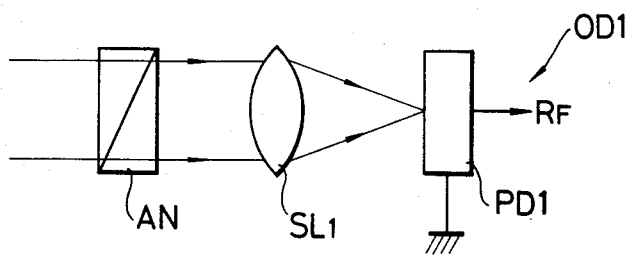
FIG. 1B is a schematic view of signal system optical detecting means of the prior art.

Referring to FIG. 1A, a laser beam emitted from a semiconductor laser LD is collimated by a collimator lens CL. The collimated beam passes through a shape correction prism PR so as to change a sectional shape of the beam to a circular shape. The corrected beam is then incident on a first beam splitter BS1. The beam transmitted through the first beam splitter BS1 is focused by an objective lens OL, so that a beam spot is formed on a magneto-optical disk D.

The magneto-optical disk D comprises a two-sided recording medium. As shown in FIG. 2 two, vertically magnetized films 2 are, respectively, formed on the upper and lower surfaces of a protective film 1, and two transparent layers 3 are, respectively, formed on the two vertically magnetized films 2, respectively. Each vertically magnetized film 2 consists of a rare earth-iron based amorphous material.

Information is written in the magneto-optical disk D in a manner shown in FIGS. 3A, 3B and 3C. As shown in FIG. 3A, a weak magnetic field H is applied to the vertically magnetized film 2 with a coil 4 or a permanent magnet in a vertical direction. At this time, the direction of magnetization of the magnetized portions M are aligned in the same direction, as indicated by the arrows. Subsequently, as shown in FIG. 3B during recording, a laser beam 5 irradiates a portion of the vertically magnetized film 2 upon which information is to be recorded to while the magnetic field H shown in FIG. 3A is applied. The portion upon which recording occurs is heated to invert the magnetization direction. As shown in FIG. 3C after recording has occurred, a recording pit 6 having magnetization in a direction which is opposite to the unrecorded film is formed. The recording pit 6 is formed in tracks which are spirally or concentrically formed in the magneto-optical disk D.

Erasure of the recording pit 6 which has been written in the magneto-optical disk D is done with coil 4 or a permanent magnet so as to reverse the direction of magnetization the magnetic field H.

On the other hand, a return beam reflected by the magneto-optical disk D is incident on the objective lens OL and is collimated. The collimated beam is incident on the first beam splitter BS1. A reflected beam component of the return beam is incident on a second beam splitter BS2.

The return beam reflected by the second beam splitter BS2 is incident on a signal system optical detecting means OD1. The optical detecting means OD1 comprises an analyzer AN, a lens SL1 and a photodetector PD1, as shown in FIG. 1B. When the return beam is incident on the analyzer AN, the photodetector PD1 generates a read information signal $R_F$.

Since the plane of polarization of the return beam is rotated due to the direction of magnetization of the recording pit 6 according to the Kerr effect, the rotation of the plane of polarization can be detected by the photodetector PD1 which produces the signal $R_F$ obtained from the magneto-optical disk D.

Figure 1C:
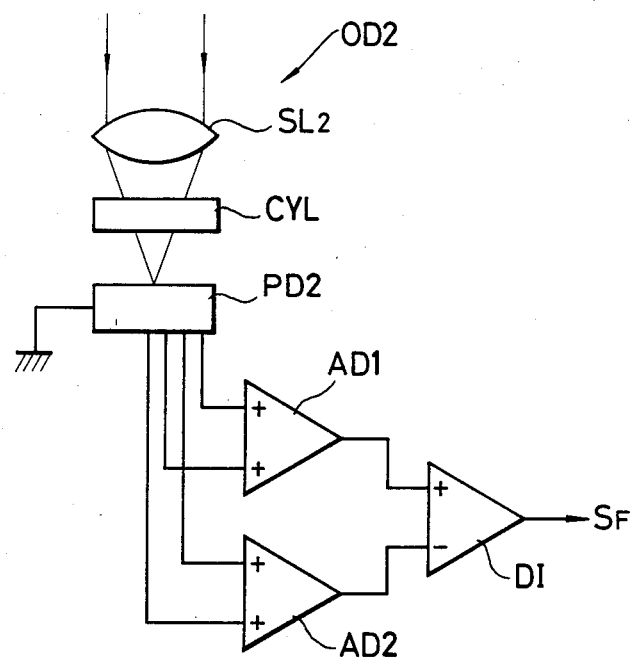
FIG. 1C is a schematic view of servo system optical detecting means of the prior art.

On the other hand, the return beam passing through the second beam splitter BS2 is also incident on a servo system optical detecting means OD2. The optical detecting means OD2 comprises a lens SL2, a cylindrical lens CYL, a photodetector PD2, adders AD1 and AD2 and a subtractor DI, as shown in FIG. 1C. A portion of the return beam is incident on the lens SL2. Four detecting sections (not shown) are arranged in the photodetector PD2. Detected signals from one pair of detecting sections which diagonally oppose each other are supplied to the adder AD1, and detected signals from the other pair of detecting sections are supplied to the adder AD2. The outputs from the adders AD1 and AD2 are supplied to the subtracter DI, and the subtracter DI generates a focus error signal $S_F$. The generation technique of the signal $S_F$ is disclosed in U.S. Pat. No. 4,023,033 which is hereby incorporated by reference, and a detailed description thereof will be omitted.

The focus error signal $S_F$ is applied to a focus coil FC so as to move the objective lens OL in a focus direction with a closed loop focus servo system. A tracking servo system including the detection of the tracking error signal is well known in the prior art, and a detailed description thereof will be omitted.

Figure 4:
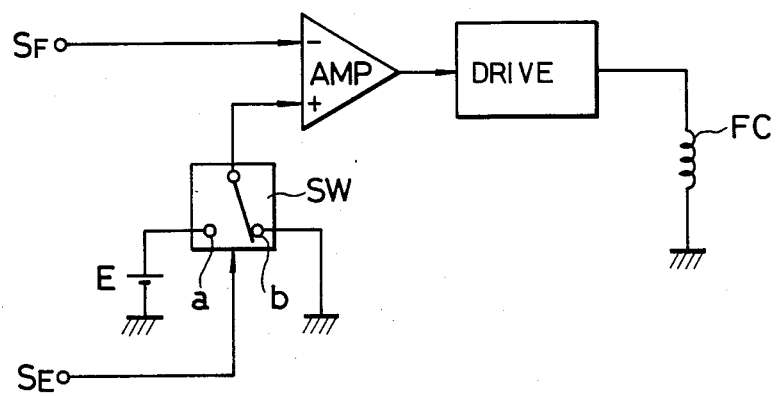
FIG. 4 is a block diagram of a focus coil control circuit.

The drive control of the objective lens OL in the erasure mode will be described with reference to FIG. 4.

The focus error signal $S_F$ generated from the output of the servo system optical detecting means OD2 is supplied to one input terminal of a differential amplifier AMP. The output from the moveable contact of a switch SW which switched in response to an erasure instruction signal $S_E$ is supplied to the other input terminal of the differential amplifier AMP. One input terminal a of the switch SW receives a predetermined voltage E, and the other input terminal b is grounded. The switch SW is switched from the input terminal b to the input terminal a by the erasure instruction signal $S_E$, so that the predetermined voltage E is applied to the switch contact to supply it to the other input terminal of the differential amplifier AMP. The difference between the focus error signal $S_F$ and the predetermined voltage E is amplified by the amplifier AMP, and a predetermined DC signal is added to this focus error signal $S_F$.

Figure 5:
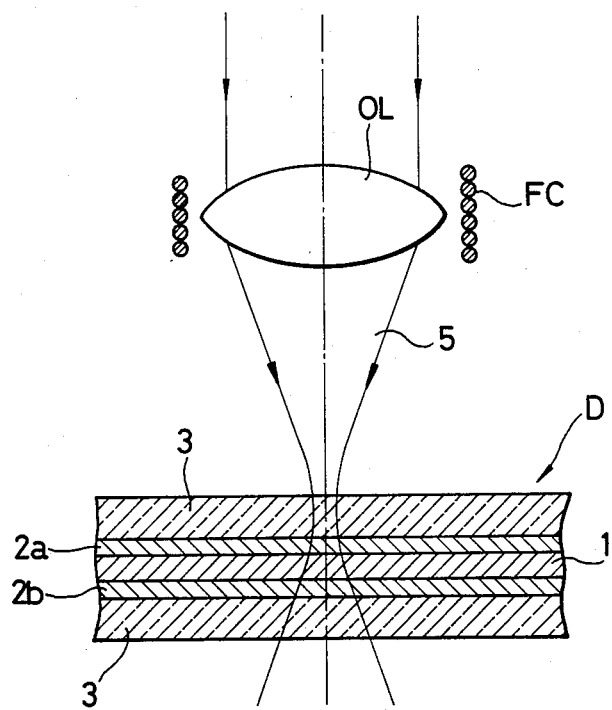
FIG. 5 is sectional view for explaining a what happens when a laser beam irradiates a magneto-optical disk.

The signal $S_F$ to which has been added the DC signal is supplied to the focus coil FC through a drive circuit DRIVE. This causes, the objective lens OL to be shifted in the focus direction. In this case, as shown in FIG. 5, the beam 5 is focused before before it impinges on the vertically magnetized film 2a of the magneto-optical disk D which is being erased. The objective lens OL is shifted to a position which corresponds to the predetermined voltage E in such a manner that a defocused beam irradiates the surface of the vertically magnetized film 2a. When the defocused beam 5 irradiates the vertically magnetized film 2a, the beam spot diameter is increased due to the fact that the beam 5 is defocused at that point.

According to the present invention, therefore, in order to increase the diameter of the beam which irradiates the vertically magnetized film 2a of the magneto-optical disk D during erasure, without increasing the output level of the semiconductor laser LD, the beam spot diameter is increased by slightly defocusing the beam, and this prevents the vertically magnetized film 2a from being recrystallized as in prior art systems. In addition, the beam 5 is focused at a position before the vertically magnetized film 2a. Therefore, even if one vertically magnetized film 2a of a two-sided magneto-optical disk D is erased, the other vertically magnetized film 2b will not be adversely influenced.

In the above embodiment, the difference between the the focus error signal $S_F$ and the predetermined voltage E is calculated by the differential amplifier AMP so as to add a predetermined DC signal to the focus error signal $S_F$. However, an adder may be used to directly add a predetermined DC signal to the focus error signal $S_F$.

What is claimed is:

1. A magneto-optical recording apparatus for use with a magneto-optical medium having a first amorphous layer recording layer comprising, a laser source producing a laser beam, means for projecting said laser beam onto said magneto-optical layer and a reflected laser beam produced thereby, an objective lens through which said laser beam and said reflected laser beam pass, means for generating a focus error signal, a focusing coil mounted so as to move said objective lens normal to said magneto-optical medium in response to said focus error signal so that said laser beam is focused on said first layer of said magneto-optical medium during the recording mode of operation; a D.C. signal source, and adding means for adding said D.C. signal to said focus error signal during the erasing mode of operation so that the beam of said laser source is focused on a plane in front of said first layer of said magneto-optical medium and intelligence recorded on said first layer of said magneto-optical medium will be erased.

2. A magneto-optical recording apparatus according to claim 1 wherein a second amorphous material layer is formed on said magneto-optical medium and said beam of said laser is focused on a plane which is between said objective lens and said first amorphous layer during the erasing mode when said first amorphous layer is erased.

* * * * *